June 20, 1933.  M. P. MOSHER ET AL  1,915,238
REEL
Filed May 21, 1931
Fig. 1.
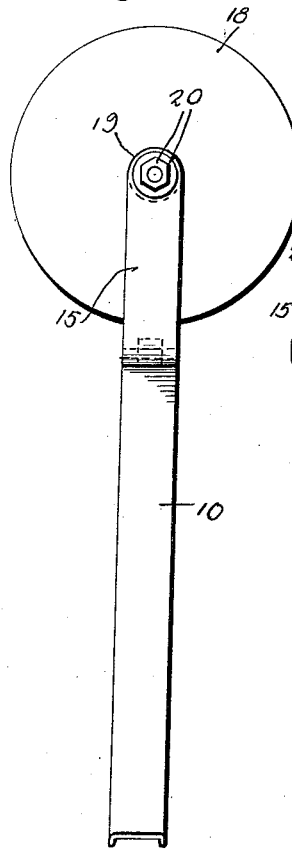
Fig. 2.
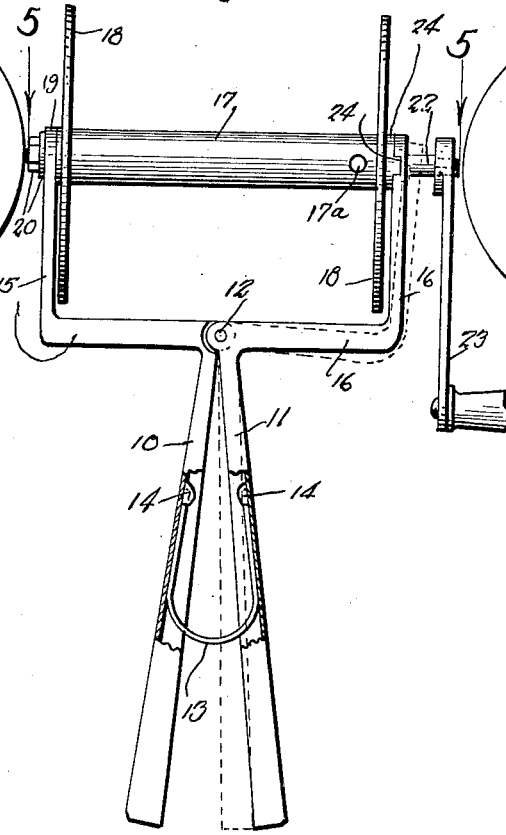
Fig. 3.
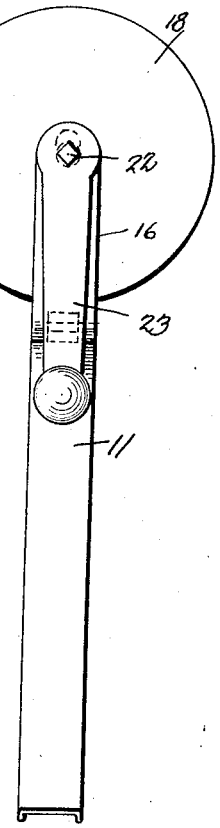
Fig. 4.
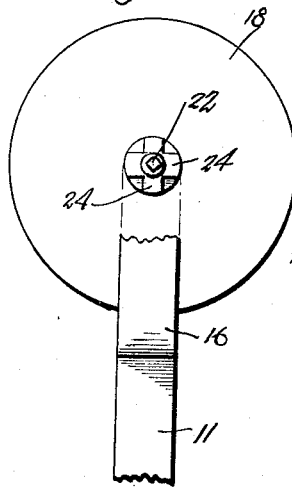
Fig. 5.
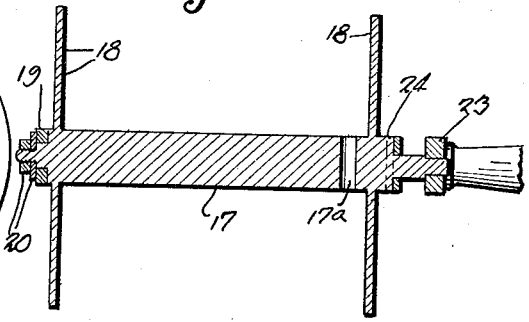
Fig. 6.
Inventor
W. J. McCarthy.
M. P. Mosher.
By
J. K. Bryant. Attorney Patented June 20, 1933

1,915,238

UNITED STATES PATENT OFFICE

MARLIN P. MOSHER AND WILLIAM J. McCARTHY, OF SALAMANCA, NEW YORK

REEL

Application filed May 21, 1931. Serial No. 539,097.

This invention relates to certain new and useful improvements in reels.

The primary object of the invention is to provide a reel of the portable type for carrying ropes or lines of different characters such as clothes lines, kite or fishing line, or in any connection where a rope, cord or thread is wound upon a reel, the reel comprising a spool or the like journalled in the frame with clutch devices operated by a handle of the portable device for freeing the spool to permit unrestricted unwinding of the rope or line.

A further object of the invention is to provide a portable reel of the foregoing character wherein a reel frame comprised of pivotally connected tensioned handles is provided with side bearing arms for the support of a spool with a positive clutch device provided between one end of the spool and a supporting handle.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is an edge elevational view of a portable reel constructed in accordance with the present invention;

Figure 2 is a front elevational view of the reel, partly broken away and shown in section to illustrate the spring associated with the handles of the portable frames with a spool supporting arm carried by one handle member illustrated in its dotted line released position from engagement with the spool;

Figure 3 is an opposite edge elevational view of the reel showing the operating handle for the spool;

Figure 4 is a fragmentary edge elevational view, similar to Figure 3, with a part of the spool supporting arm broken away to illustrate the clutch member carried by the spool;

Figure 5 is a horizontal sectional view taken on line 5—5 of Figure 2; and

Figure 6 is a fragmentary perspective view of the clutch arm carried by the handle of the portable frame.

Referring more in detail to the accompanying drawing, there is illustrated a portable reel for the support of a line, such as used for clothes lines, the flying of kites, or in any connection where a reel or spool is utilized for the winding of a cord or line thereon, the portable reel including a portable frame formed of handle sections 10 and 11 that are pivotally connected at adjacent ends as at 12, the opposite ends thereof being normally spaced from each other and so retained by the leaf spring 13 interposed between the handle sections 11, it being noted as shown in Figure 2 that the handle sections are of channel formation with the ends of the spring 13 anchored as at 14 to the bottom walls of the channel. The frame further includes a support for a reel or spool, the pivoted end of each handle section 10 and 11 carrying outwardly and angularly directed angle arms 15 and 16 respectively, the outer end portions of the angle arms 15 and 16 being arranged in parallel and provided with bearings for the support of the hub portion 17 of a spool that includes end disk walls 18.

The outer end of the angle arm 15 is provided with a bearing 19 for the support of the adjacent end of the spool hub 17 as shown in Figure 5, said end of the hub 17 being reduced and threaded for the reception of a retaining washer and nut 20. A clutch device is associated with the outer end of the angle arm 16 and adjacent end of the spool hub 17, the outer end of the arm 16 having a slotted opening 21 therein through which the reduced cylindrical end 22 of the spool hub 17 freely extends for the reception of a crank handle 23 on the outer terminal end thereof. The clutch device includes crossed ribs 24 provided on the end of the hub 17 at opposite sides of the reduced portion 22 and the outer end of the arm 16 is provided with crossed grooves 25 traversing the opening 21 to receive the crossed rib 24 as shown in Figure 2.

From the above detailed description of the invention, it is believed that the construction and operation thereof will at once be apparent, it being noted that when the clutch devices 24 and 25 are engaged under influence of the spring 13 associated with the handle sections 10 and 11, the spool is prevented from rotating, but when the handle section 11 is moved toward the handle section 10 against the tension of the spring 13, the outer angle arm 16 is moved upon the handle pivot 12 to separate the angle arm 16 from the adjacent end of the spool hub 17 whereupon the spool is permitted to revolve freely for either unwinding a line or for winding a line thereon, by the use of the crank handle 23. The clutch device is positive in its operation and the spool is effectively held against rotation. The spool hub 17 has an opening 17a therein to facilitate anchoring of one end of the line and when used as a clothes line, the outer free end of the rope may be anchored to a suitable support, an intermediate portion of the rope similarly anchored, and the portable reel may be suspended from the last support by the rope itself.

While there is herein shown and described the preferred embodiment of the invention, it is nevertheless to be understood that minor changes may be made therein without departing from the spirit and scope of the invention as claimed.

We claim:—

In a clothes line reel of the character described, a portable frame including pivotally connected handle sections, a spring interposed therebetween, angle arms at the outer ends of the handle sections, a reel journalled in the angle arms and including a hub having reduced ends extending through the arms, one end of the hub being restrained from axial movement, the other end of the hub outwardly of the arm having a crank handle attached thereto and a positive clutch connection between the last named end of the hub and associated arm, including a cross rib on the hub and a cross slot in the arm end.

In testimony whereof we affix our signatures.

MARLIN P. MOSHER.
WILLIAM J. McCARTHY.